United States Patent
Huang et al.

(10) Patent No.: US 8,845,173 B2
(45) Date of Patent: Sep. 30, 2014

(54) STATIC-FREE LIGHT GUIDE PLATE ASSEMBLY AND BACKLIGHT MODULE

(75) Inventors: Jianfa Huang, Shenzhen (CN); Yonggang Xiao, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 163 days.

(21) Appl. No.: 13/203,652

(22) PCT Filed: May 27, 2011

(86) PCT No.: PCT/CN2011/074795
§ 371 (c)(1),
(2), (4) Date: Aug. 26, 2011

(87) PCT Pub. No.: WO2012/155364
PCT Pub. Date: Nov. 22, 2012

(65) Prior Publication Data
US 2012/0294038 A1    Nov. 22, 2012

(30) Foreign Application Priority Data
May 16, 2011 (CN) .......................... 2011 1 0126122

(51) Int. Cl.
*F21V 7/04* (2006.01)
*F21V 8/00* (2006.01)
(52) U.S. Cl.
CPC ............ *G02B 6/0083* (2013.01); *G02B 6/0068* (2013.01); *G02B 6/0073* (2013.01)
USPC ....................................................... 362/611
(58) Field of Classification Search
CPC .................................................. G02B 6/0083
USPC ........................................................ 362/611
See application file for complete search history.

(56) References Cited

U.S. PATENT DOCUMENTS

| 2003/0026109 A1* | 2/2003 | Takayanagi et al. .......... 362/561 |
| 2004/0207795 A1 | 10/2004 | Sakai |

(Continued)

FOREIGN PATENT DOCUMENTS

| CN | 1523402 A | 8/2004 |
| CN | 1619366 A | 5/2005 |

(Continued)

OTHER PUBLICATIONS

English translation of KR 10-2008-0055068 (Jun. 19, 2008).*

*Primary Examiner* — Anh Mai
*Assistant Examiner* — Hana Featherly
(74) *Attorney, Agent, or Firm* — Mark M. Friedman (57) ABSTRACT

Disclosed are a static-free light guide plate and a backlight module. The static-free light guide plate comprises an incident plane, a bottom reflection plane, a side reflection plane and an out light plane. At least one layer of optical thin film material for increasing out light effect is positioned on the surface of the out light plane. The bottom reflection plane is positioned on the metal back plate. The static-free light guide plate further comprises interconnected conductive bands positioned at the side plane of the optical thin film material, non-incident portion of the incident plane, the bottom surface of the bottom reflection plane and the side reflection plane. With the conductive bands positioned at the side surface of the optical thin film material and connected to the metal back plate, the electrostatic generated on the light guide plate is transferred to achieve the purpose of protecting the electronic device, such as LEDs.

15 Claims, 8 Drawing Sheets

(56) References Cited

U.S. PATENT DOCUMENTS

2005/0110916 A1  5/2005  Park
2007/0146569 A1* 6/2007  Nouchi et al. .................. 349/58
2010/0149453 A1  6/2010  Lee
2010/0277663 A1  11/2010 Koo

FOREIGN PATENT DOCUMENTS

| CN | 101750777 A | 6/2010 |
| CN | 101881912 A | 11/2010 |
| KR | 1020080055068 A | 6/2008 |

* cited by examiner

STATIC-FREE LIGHT GUIDE PLATE ASSEMBLY AND BACKLIGHT MODULE

BACKGROUND OF THE INVENTION

1. Field of the Invention

The present invention generally relates to a light guide plate and a backlight module, and more particularly to a static-free light guide plate and a backlight module.

2. Description of Prior Art

As the state of the LED (Light Emitting Diode) art becomes blossoming gradually, all the TV makers start to pay attentions about LED backlight technology. It is understood that the CCFL (Cold Cathode Fluorescent Lamp) ultimately will be eliminated. As regarding LED as being a backlight in two types: the side-light type backlight module and the direct-light type backlight module. The side-light type backlight module has light and thin characteristic and meets the demands on the market for LED TV.

However, the side-light type backlight module has fewer amount of LEDs, any of the LEDs fails and the display brightness and quality may lead to be NG. Particularly, as the whole LED light bar is damaged, the function of the display becomes invalid. However, the major factor of causing damage to the LEDs is the damage caused by the ESD (Electro-Static discharge).

Reasons of the LED electrostatic damage exist. For example, the damage during the packaging the LED, electrostatic on human body as assembling in the manufacture process of light bar and etc. The electrostatic generated by friction between the light guide plate and the optical thin film material is hardest to be controlled. The electrostatic voltmeter that the LED can hold is less than 1000V but the electrostatic on human body can reach 25 KV. The electrostatic generated by the friction of the optical thin film material also can reach the level of thunderbolt. The mobility of the electrostatic can be charge induction, charge transfer and etc. The transfer direction of the transferred is random. In all the aforesaid processes, the high voltage electrostatic has possibility to be transferred to the light bar and damages the LEDs.

Therefore, there is a need to provide a static-free light guide plate assembly and a backlight module to solve the existed issues of prior arts.

SUMMARY OF THE INVENTION

An objective of the present invention is to provide a static-free light guide plate assembly and a backlight module, for solving the electrostatic damage issue of the light guide plate of prior art.

For realizing the aforesaid objective, the present invention provides a static-free light guide plate assembly comprising: an incident plane, a bottom reflection plane, a side reflection plane and an out light plane. At least one layer of optical thin film material for increasing out light effect is positioned on the surface of the out light plane. The bottom reflection plane is positioned on the metal back plate. The static-free light guide plate assembly further comprises interconnected conductive bands positioned at the side plane of the optical thin film material, non-incident portion of the incident plane, the bottom surface of the bottom reflection plane and the side reflection plane. The conductive bands are conductive tapes, conductive foams, conductive metal gauzes sheet metals or metal powder.

The present invention also provides a static-free light guide plate assembly, comprising an incident plane, a bottom reflection plane, a side reflection plane and an out light plane. At least one layer of optical thin film material for increasing out light effect is positioned on the surface of the out light plane. The bottom reflection plane is positioned on the metal back plate. The static-free light guide plate assembly further comprises interconnected conductive bands positioned at the side plane of the optical thin film material, non-incident portion of the incident plane and the bottom surface of the bottom reflection plane.

The present invention also provides a backlight module, comprising a light source and a static-free light guide plate assembly, comprising: an incident plane, a bottom reflection plane, a side reflection plane and an out light plane. At least one layer of optical thin film material for increasing out light effect is positioned on the surface of the out light plane. The bottom reflection plane is positioned on the metal back plate. The static-free light guide plate assembly further comprises interconnected conductive bands positioned at the side plane of the optical thin film material, non-incident portion of the incident plane and the bottom surface of the bottom reflection plane.

In one exemplary embodiment of the present invention, the interconnected conductive bands are positioned at the side plane of the optical thin film material, non-incident portion of the incident plane, the bottom surface of the bottom reflection plane and the side reflection plane.

In one exemplary embodiment of the present invention, the conductive bands are conductive tapes, conductive foams, conductive metal gauzes sheet metals or metal powder.

In one exemplary embodiment of the present invention, the ohm of the conductive band is smaller than 0.5 Ω/m and the thickness of the conductive band is smaller than 0.2 mm.

In one exemplary embodiment of the present invention, the resistance of the conductive bands and the metal back plate is smaller than 10 Ω.

Comparing with the light guide plate of prior art having the LED electrostatic damage issue, the conductive bands are positioned at the side plane of the optical thin film material to be connected to the metal back plate in the static-free light guide plate assembly and the backlight module of the present invention. Accordingly, the electrostatic generated by the mutual friction of the optical thin film material and the mutual friction between the optical thin film material and the light guide plate is transferred away from the light bars for protecting the LEDs or other electronic devices which are easily damaged by the electrostatic.

For a better understanding of the aforementioned content of the present invention, preferable embodiments are illustrated in accordance with the attached figures for further explanation:

DETAILED DESCRIPTION OF THE INVENTION

The following descriptions for the respective embodiments are specific embodiments capable of being implemented for illustrations of the present invention with referring to appended figures. For example, the terms of up, down, front, rear, left, right, interior, exterior, side, etcetera are merely directions of referring to appended figures. Therefore, the wordings of directions are employed for explaining and understanding the present invention but not limitations thereto.

In figures, the elements with similar structures are indicated by the same number.

Figure 1:
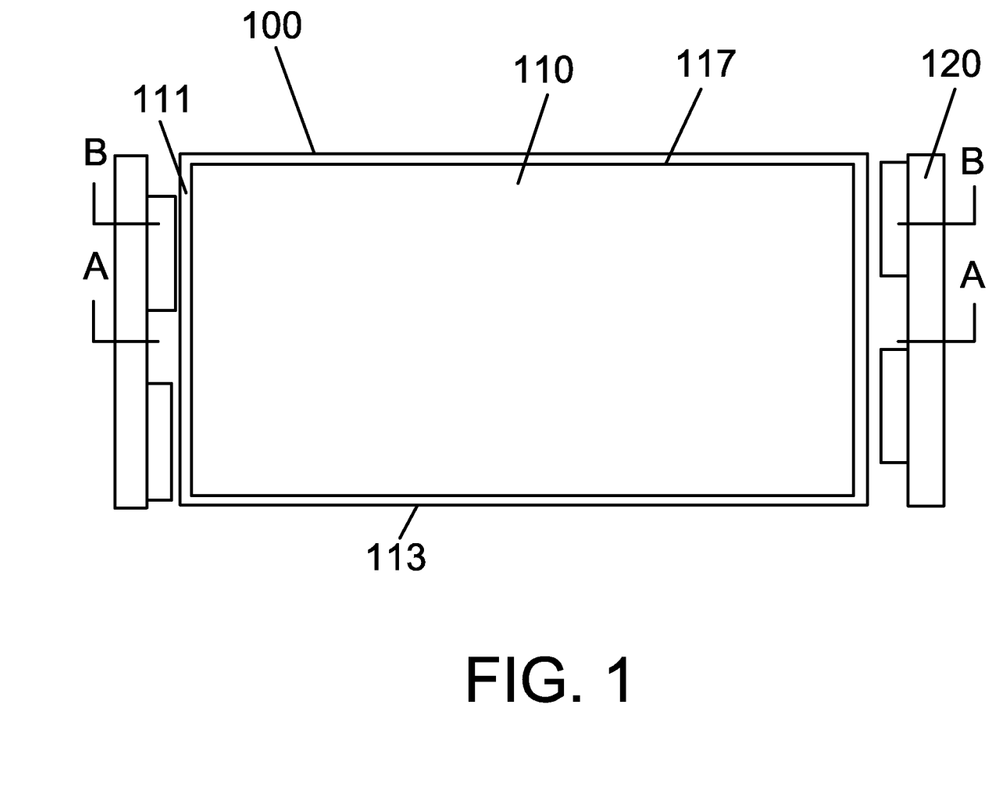
FIG. 1 shows a structure diagram of a first preferable embodiment of a backlight module according to the present invention.
Figure 2:
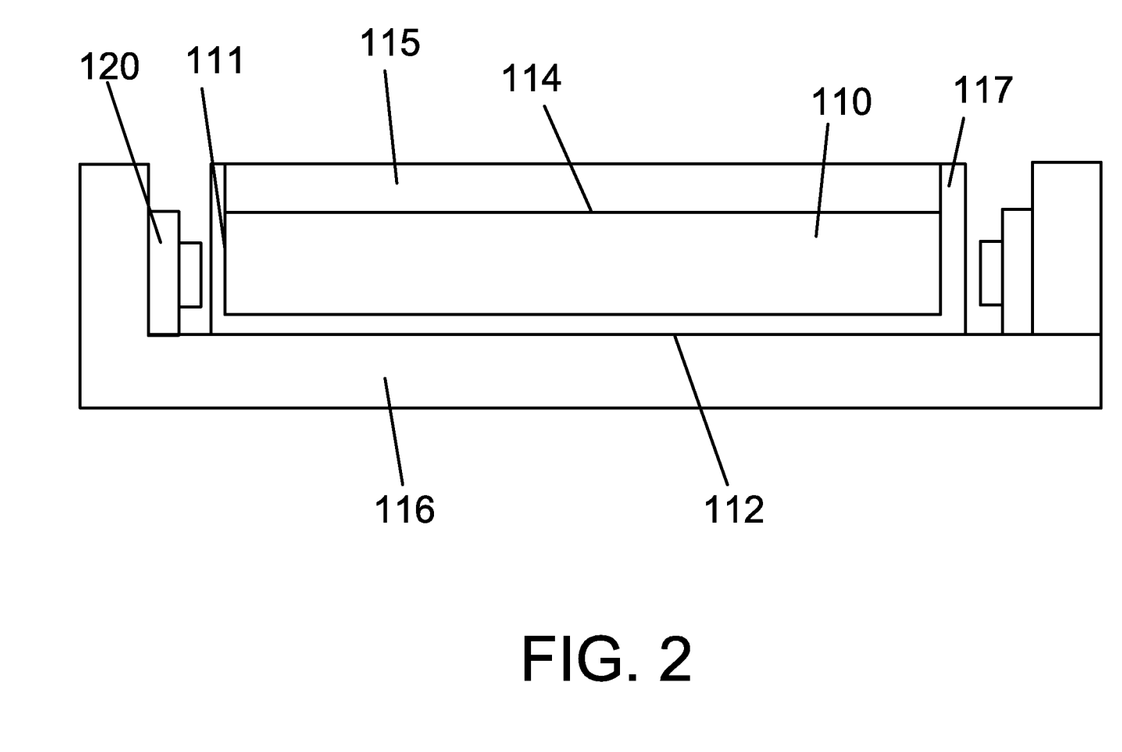
FIG. 2 shows a sectional structure diagram taken along line A-A of FIG. 1.
Figure 3:
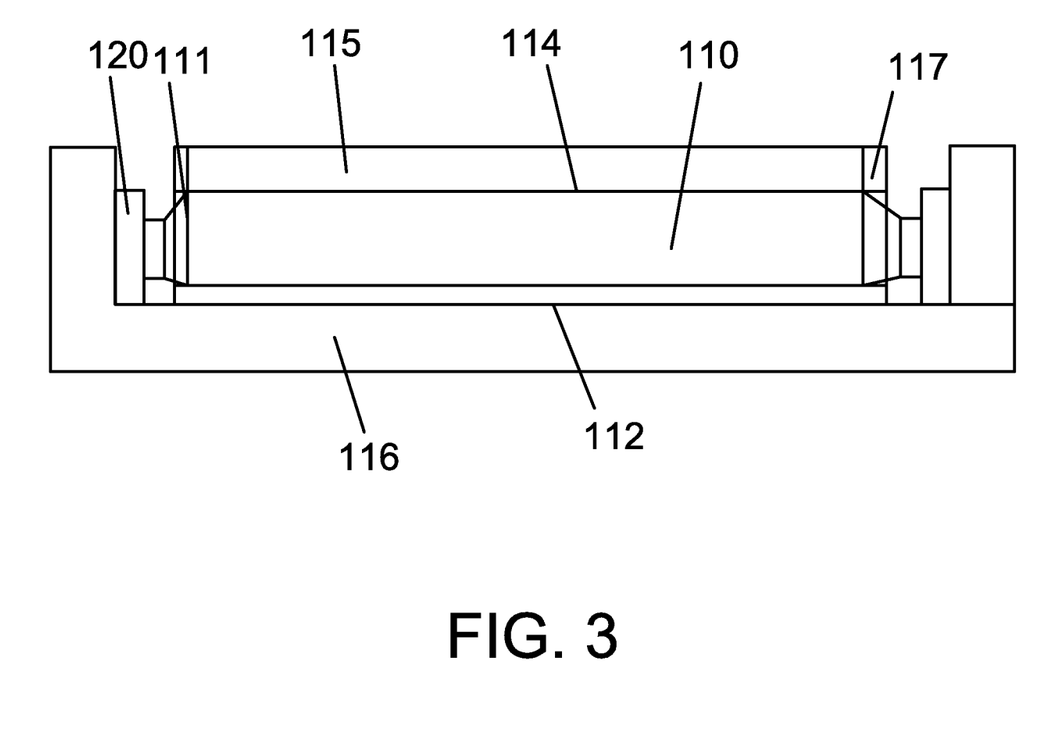
FIG. 3 shows a sectional structure diagram taken along line B-B of FIG. 1.

Please refer to FIGS. 1-3, which show structure diagrams of the first preferable embodiment of a backlight module according to the present invention. The backlight module 100 of the present invention can be a side-light type backlight module installed in accordance with a display panel (such as LCD panel) to form a display device (such as LCD device). The backlight module 100 comprises a light guide plate 110 and a light source 120. The light source 120 can be such as, LED (Light Emitting Diode), OLED (Organic Light Emitting Diode), light bars or the combinations thereof. The light guide plate 110 comprises an incident plane 111, a bottom reflection plane 112, a side reflection plane 113 and an out light plane 114. The incident plane 111 is positioned corresponding to the light source 120 to receive the light of the light source 120 into the light guide plate 110. At least one layer of optical thin film material 115 for increasing out light effect is positioned on the surface of the out light plane 114. The bottom reflection plane 112 is positioned on a metal back plate 116. The light guide plate 110 further comprises interconnected conductive bands 117 positioned at the side plane of the optical thin film material 115, non-incident portion of the incident plane 111, the bottom surface of the bottom reflection plane 112 and the side reflection plane 113.

In a first preferable embodiment of light guide plate according to the present invention shown in FIG. 1, the conductive bands 117 are positioned around the side surface of the optical thin film material 115. FIG. 2 shows a sectional structure diagram taken along line A-A of FIG. 1. As shown in FIG. 2, the conductive bands 117 are also positioned at the non-incident portion of the incident plane 111 and around bottom surface of the bottom reflection plane 112. FIG. 3 shows a sectional structure diagram taken along line B-B of FIG. 1. As shown in FIG. 3, the conductive bands 117 are not positioned at the incident portion of the incident plane 111. Therefore, the setting of the conductive bands 117 does not affect the light of the light source 120 entering the light guide plate 110. The conductive band 117 can be very narrow and do not affect the display effect of the display device. Meanwhile, all the conductive bands 117 are demanded to be interconnected. Therefore, the electric charge can be effectively conducted around the light guide plate 110. The light guide plate 110 and optical thin film material 115 are well connected to the metal back plate 116 through the conductive bands 117. Accordingly, as long as the flow of the electric charge is directed toward the conductive bands 117, the electric charge is transferred to the metal back plate 116 through the conductive bands 117 positioned at the non-incident portion of the incident plane 111, the conductive bands 117 at the side reflection plane 113 and then to be neutralized. Consequently, it is ensured that the electrostatic generated by the mutual friction of the optical thin film material 115 and the mutual friction between the optical thin film material 115 and the light guide plate 110 do not damage the LEDs to promote the reliability of the backlight module 100. In this embodiment, the conductive bands 117 can be selectively positioned at the side reflection plane 113. The electric charge caused by the electrostatic can be transferred toward the metal back plate 116 and then neutralized more quickly when the conductive bands 117 are positioned at the side reflection plane 113. Certainly, without the conductive bands 117 at the side reflection plane 113, the objective of the present invention still can be achieved.

Figure 4:
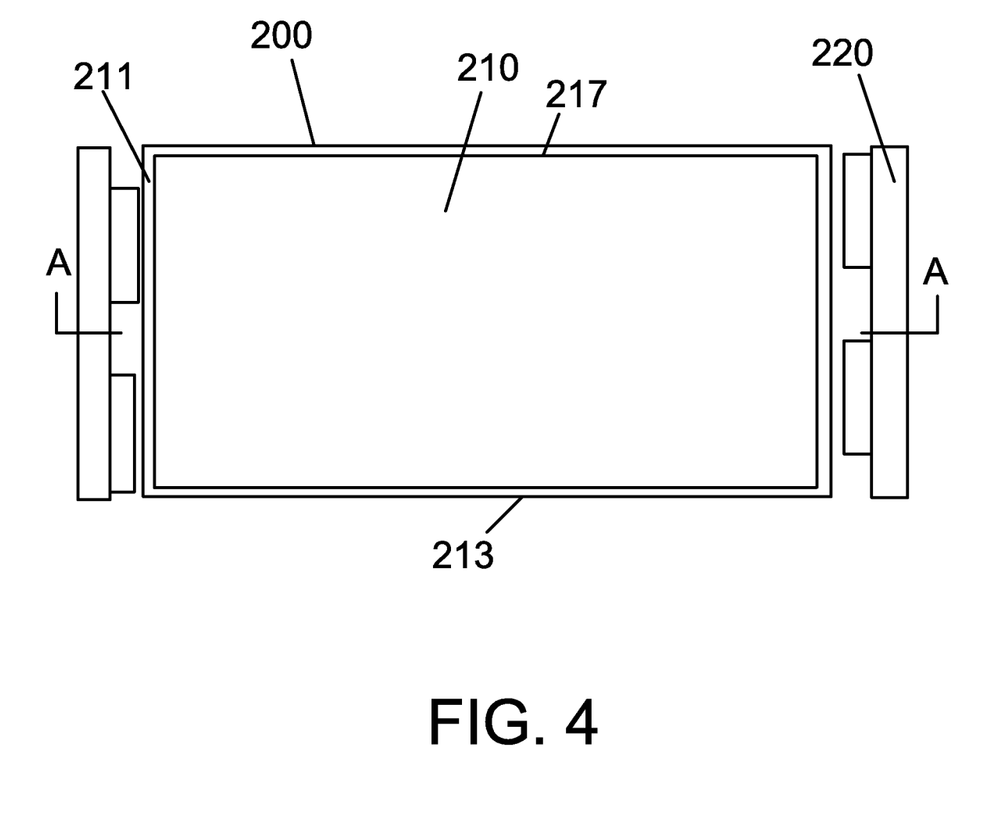
FIG. 4 shows a structure diagram of a second preferable embodiment of a backlight module according to the present invention.
Figure 5:
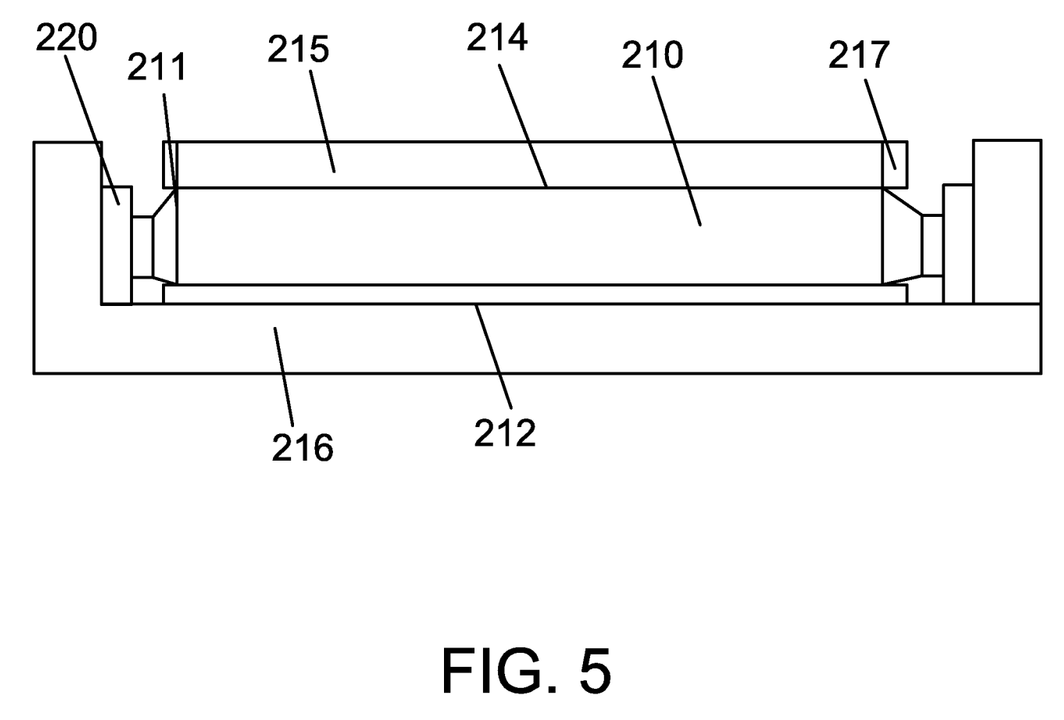
FIG. 5 shows a sectional structure diagram taken along line A-A of FIG. 4.

Please refer to FIG. 4 and FIG. 5, which show structure diagrams of the second preferable embodiment of a backlight module according to the present invention. The light guide plate 210 comprises an incident plane 211, a bottom reflection plane 212, a side reflection plane 213 and an out light plane 214. The interconnected conductive bands 117 are also positioned at the side plane of the optical thin film material 215, the bottom surface of the bottom reflection plane 212 and the side reflection plane 213. As shown in FIG. 4, the conductive bands 117 are also positioned around the side surface of the optical thin film material 215 and at the side reflection plane 213. FIG. 5 shows a sectional structure diagram taken along line A-A of FIG. 4. As shown in FIG. 5, the conductive bands 117 are positioned at the two sides of the bottom reflection plane 212 (the upper and lower sides shown in FIG. 4). All the conductive bands 117 are demanded to be interconnected. Therefore, the electric charge can be effectively conducted around the light guide plate 210. The light guide plate 210 and optical thin film material 215 are well connected to the metal back plate 216 through the conductive bands 217. Accordingly, as long as the flow of the electric charge is directed toward the conductive bands 217, the electric charge is transferred to the metal back plate 216 through the conductive bands 217 at the side reflection plane 213 and then to be neutralized. Consequently, it is ensured that the electrostatic generated by the mutual friction of the optical thin film material 215 and the mutual friction between the optical thin film material 215 and the light guide plate 210 do not damage the LEDs to promote the reliability of the backlight module 200. In this embodiment, none of the conductive bands 217 is positioned at the incident portion of the incident plane 211. Therefore, the conductive bands 217 do not affect the entering light of the light source 120 at all.

Figure 6:
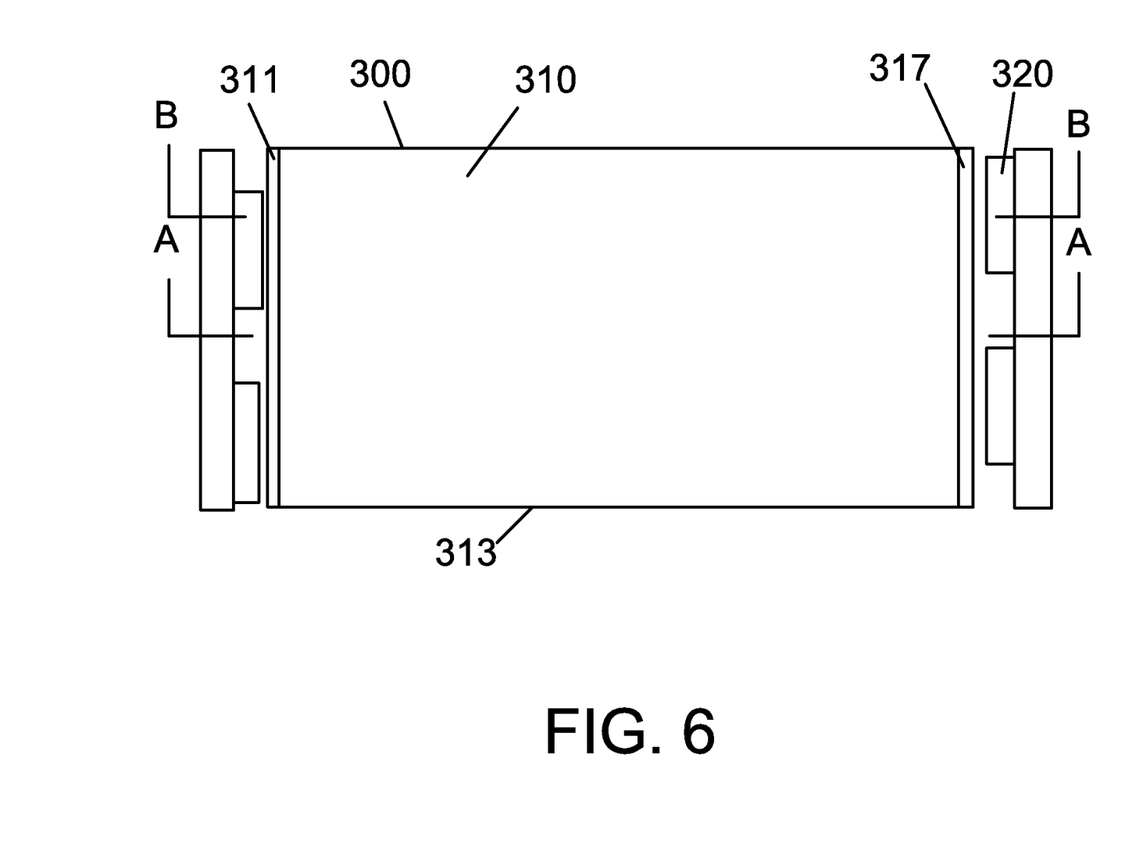
FIG. 6 shows a structure diagram of a third preferable embodiment of a backlight module according to the present invention.
Figure 7:
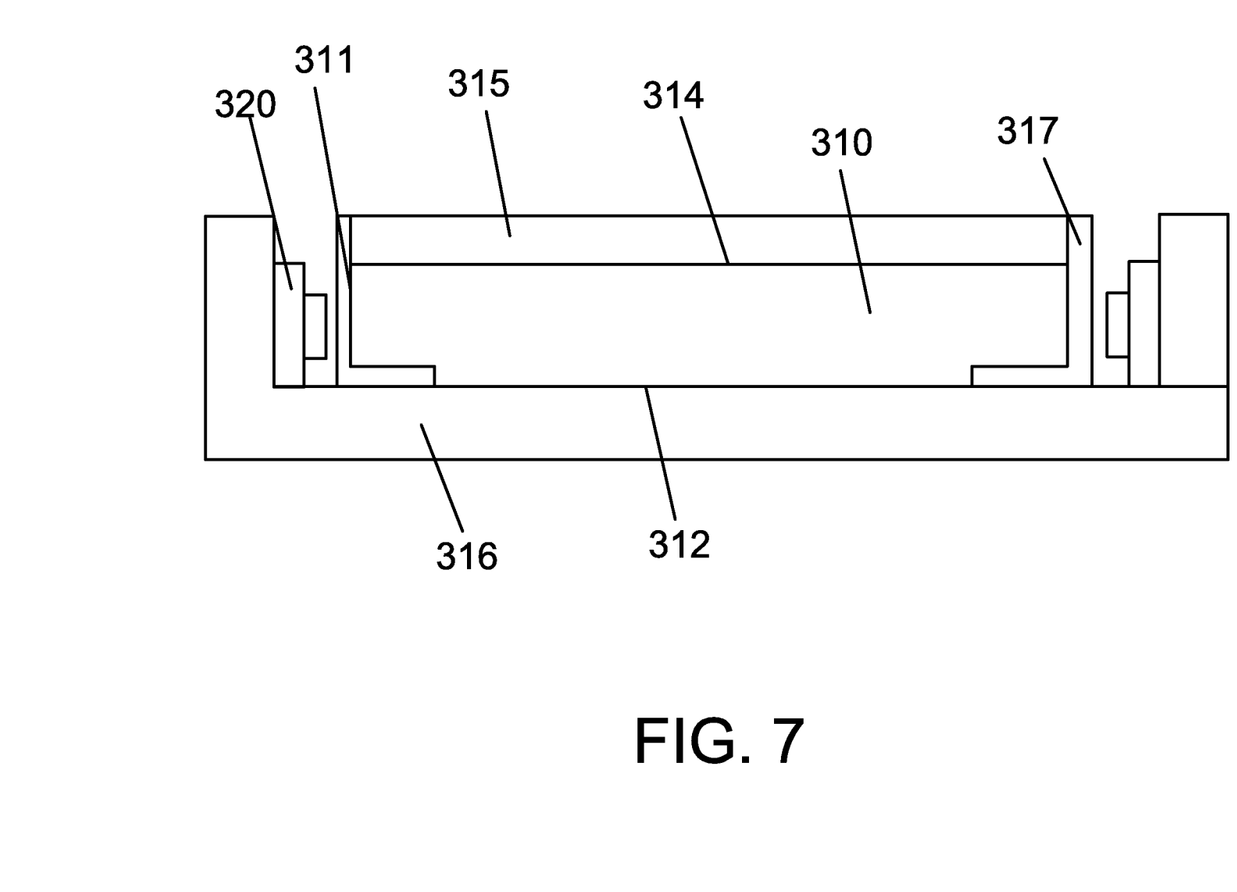
FIG. 7 shows a sectional structure diagram taken along line A-A of FIG. 6.
Figure 8:
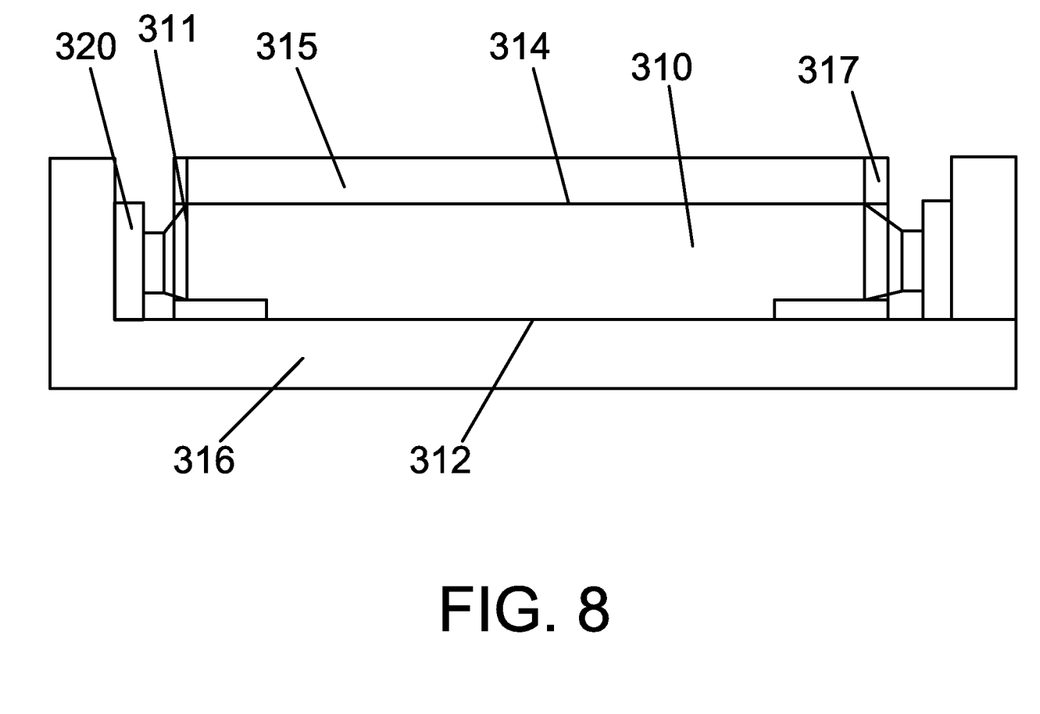
FIG. 8 shows a sectional structure diagram taken along line B-B of FIG. 6.

Please refer to FIGS. 6-8, which show structure diagrams of the third preferable embodiment of a backlight module according to the present invention. The light guide plate 310 comprises an incident plane 311, a bottom reflection plane 312, a side reflection plane 313 and an out light plane 314. The interconnected conductive bands 317 are also positioned at the side plane of the optical thin film material 315, non-incident portion of the incident plane 311 and the bottom surface of the bottom reflection plane 312. As shown in FIG. 6, the conductive bands 317 are also positioned at the two sides of the optical thin film material 315. FIG. 7 shows a sectional structure diagram taken along line A-A of FIG. 6. As shown in FIG. 7, the conductive bands 317 are positioned at the non-incident portion of the incident plane 311 and the two sides of the bottom surface of the bottom reflection plane 312 (the left and right sides shown in FIG. 6). FIG. 8 shows a sectional structure diagram taken along line B-B of FIG. 6. As shown in FIG. 8, the conductive bands 317 are not positioned at the incident portion of the incident plane 311. Therefore, the setting of the conductive bands 317 does not affect the light of the light source 320 entering the light guide plate 310.

All the conductive bands 317 are demanded to be interconnected. Therefore, the electric charge can be effectively conducted around the light guide plate 310. The light guide plate 310 and optical thin film material 315 are well connected to the metal back plate 316 through the conductive bands 317. Accordingly, as long as the flow of the electric charge is directed toward the conductive bands 317, the electric charge is transferred to the metal back plate 316 through the conductive bands 317 positioned at the non-incident portion of the incident plane 311. Consequently, it is ensured that the electrostatic generated by the mutual friction of the optical thin film material 315 and the mutual friction between the optical thin film material 315 and the light guide plate 310 do not damage the LEDs to promote the reliability of the backlight module 300. In this embodiment, the conductive bands 317 are not positioned at the other two sides of the optical thin film material 315 and the side reflection plane 313. However, the great neutralization effect of the electrostatic charge still can be achieved merely by the conductive bands 317 at the non-incident portion of the incident plane 311. Therefore, the assembly of the backlight module 300 can be simplified and the assembly hour can be saved.

In the preferable embodiments of the present invention, the conductive bands 117 are conductive tapes, conductive foams, conductive metal gauzes sheet metals or metal powder. The ohm of the conductive band 117 is smaller than 0.5 $\Omega$/m and the thickness of the conductive band 117 is smaller than 0.2 mm. The resistance of the conductive bands 117 and the metal back plate 116 is smaller than 10 $\Omega$.

The conductive bands 117 are attached at the bottom surface of the bottom reflection plane 112, at the light guide plate 110 and around the optical thin film material 115. The conductive bands 117 can be conductive tapes, conductive foams, conductive metal gauzes sheet metals or metal powder, such as conductive silver glue. The electric charge is transferred to the metal back plate 116 connected to the bottom reflection plane 112 through the optical thin film material 115, the light guide plate 110 and the conductive bands 117. Accordingly, LEDs at one side of the light guide plate 110 are effectively protected. The ohm of the conductive band is smaller than 0.5 $\Omega$/m to prevent overheating of the conductive bands 117. The resistance of the conductive bands 117 and the metal back plate 116 is smaller than 10$\Omega$ to prevent the heating of the conductive bands 117 affecting the thermal dissipation of the metal back plate 116. The thickness of the conductive band 117 is smaller than 0.2 mm so that the conductive band 117 per se does not affect the backlight module 100.

The present invention is also related with a backlight module 100 comprising a light source 100 and a light guide plate 110, comprising: an incident plane 111, a bottom reflection plane 112, a side reflection plane 113 and an out light plane 114. At least one layer of optical thin film material 115 for increasing out light effect is positioned on the surface of the out light plane 114. The bottom reflection plane 112 is positioned on a metal back plate 116. The light guide plate 110 further comprises interconnected conductive bands 117 positioned at the side plane of the optical thin film material 115, non-incident portion of the incident plane 111, the bottom surface of the bottom reflection plane 112 and the side reflection plane 113. The interconnected conductive bands 217 also can be positioned at the side plane of the optical thin film material 215, around the bottom surface of the bottom reflection plane 212 and at the side reflection plane 213 at the same time. The conductive bands 317 also can be positioned at the sides of the optical thin film material 315, at the non-incident portion of the incident plane 311 and at the bottom surface of the bottom reflection plane 312. The ohm of the conductive band is smaller than 0.5 $\Omega$/m. The thickness of the conductive band 117 is smaller than 0.2 mm. The resistance of the conductive bands 117 and the metal back plate 116 is smaller than 10$\Omega$. As regarding the detail description and the benefit of the backlight module 100 according to the present invention, please refer to the embodiments of the aforesaid static-free light guide plate assembly.

As aforementioned, the conductive bands are positioned at the side plane of the optical thin film material to be connected to the metal back plate in the static-free light guide plate assembly and the backlight module of the present invention. Accordingly, the electrostatic generated by the mutual friction of the optical thin film material and the mutual friction between the optical thin film material and the light guide plate is transferred away from the light bars for protecting the LEDs or other electronic devices which are easily damaged by the electrostatic.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A static-free light guide plate assembly, comprising:
   an incident plane, a bottom reflection plane, a side reflection plane and an out light plane;
   at least one layer of optical thin film material for increasing out light effect is positioned on the surface of the out light plane; and
   the bottom reflection plane is positioned on a metal back plate;
   which is characterized in that the static-free light guide plate assembly further comprises conductive bands which are interconnected and positioned at the side plane of the optical thin film material, non-incident portion of the incident plane, the bottom surface of the bottom reflection plane and the side reflection plane, wherein the conductive bands are positioned at the two sides of the bottom surface contacting the metal back plate and the electric charge is transferred toward the metal back plate and then neutralized; and
   the conductive bands are conductive tapes, conductive foams, conductive metal gauzes, sheet metals, or metal powder.

2. A static-free light guide plate assembly, comprising:
   an incident plane, a bottom reflection plane, a side reflection plane, and an out light plane;
   at least one layer of optical thin film material for increasing out light effect is positioned on the surface of the out light plane; and
   the bottom reflection plane is positioned on a metal back plate;
   which is characterized in that the static-free light guide plate assembly further comprises conductive bands which are interconnected and positioned at the side plane of the optical thin film material, non-incident portion of the incident plane and the bottom surface of the bottom reflection plane, wherein the conductive bands are positioned at the two sides of the bottom surface contacting the metal back plate and the electric charge is transferred toward the metal back plate and then neutralized.

3. The static-free light guide plate assembly of claim 2, characterized in that the interconnected conductive bands are positioned at the side plane of the optical thin film material, non-incident portion of the incident plane, the bottom surface of the bottom reflection plane and the side reflection plane.

4. The static-free light guide plate assembly of claim 3, characterized in that the ohm of the conductive band is smaller than 0.5 Ω/m and the thickness of the conductive band is smaller than 0.2 mm.

5. The static-free light guide plate assembly of claim 3, characterized in that the resistance of the conductive bands and the metal back plate is smaller than 10 Ω.

6. The static-free light guide plate assembly of claim 2, characterized in that the conductive bands are conductive tapes, conductive foams, conductive metal gauzes, sheet metals, or metal powder.

7. The static-free light guide plate assembly of claim 2, characterized in that the ohm of the conductive band is smaller than 0.5 Ω/m and the thickness of the conductive band is smaller than 0.2 mm.

8. The static-free light guide plate assembly of claim 2, characterized in that the resistance of the conductive bands and the metal back plate is smaller than 10 Ω.

9. A backlight module, comprising:
a light source; and
a static-free light guide plate assembly, comprising:
an incident plane, a bottom reflection plane, a side reflection plane and an out light plane;
at least one layer of optical thin film material for increasing out light effect is positioned on the surface of the out light plane; and
the bottom reflection plane is positioned on a metal back plate;

which is characterized in that the static-free light guide plate assembly further comprises conductive bands which are interconnected and positioned at the side plane of the optical thin film material, non-incident portion of the incident plane and the bottom surface of the bottom reflection plane, wherein the conductive bands are positioned at the two sides of the bottom surface contacting the metal back plate and the electric charge is transferred toward the metal back plate and then neutralized.

10. The backlight module of claim 9, characterized in that the interconnected conductive bands are positioned at the side plane of the optical thin film material, non-incident portion of the incident plane, the bottom surface of the bottom reflection plane and the side reflection plane.

11. The backlight module of claim 10, characterized in that the ohm of the conductive band is smaller than 0.5 Ω/m and the thickness of the conductive band is smaller than 0.2 mm.

12. The backlight module of claim 10, characterized in that the resistance of the conductive bands and the metal back plate is smaller than 10 Ω.

13. The backlight module of claim 9, characterized in that the conductive bands are conductive tapes, conductive foams, conductive metal gauzes, sheet metals, or metal powder.

14. The backlight module of claim 9, characterized in that the ohm of the conductive band is smaller than 0.5 Ω/m and the thickness of the conductive band is smaller than 0.2 mm.

15. The backlight module of claim 9, characterized in that the resistance of the conductive bands and the metal back plate is smaller than 10 Ω.

\* \* \* \* \*